United States Patent
Moyal et al.

(10) Patent No.: US 11,872,486 B2
(45) Date of Patent: Jan. 16, 2024

(54) APPLYING AUGMENTED REALITY-BASED GAMIFICATION TO HAZARD AVOIDANCE

(71) Applicant: International Business Machines Corporation, Armonk, NY (US)

(72) Inventors: Shailendra Moyal, Pune (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 7 days.

(21) Appl. No.: 17/332,183

(22) Filed: May 27, 2021

(65) Prior Publication Data
US 2022/0379207 A1    Dec. 1, 2022

(51) Int. Cl.
*A63F 13/52* (2014.01)
*G06T 11/00* (2006.01)

(52) U.S. Cl.
CPC .............. *A63F 13/52* (2014.09); *G06T 11/00* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 9,703,369 B1* | 7/2017 | Mullen | A63F 13/843 |
| 2006/0287025 A1* | 12/2006 | French | A63F 13/843 463/4 |
| 2010/0056243 A1* | 3/2010 | Czyzewski | G07F 17/3295 463/16 |
| 2012/0135793 A1* | 5/2012 | Antonopoulos | A63F 3/0605 463/17 |
| 2013/0293586 A1 | 11/2013 | Kaino | |
| 2016/0140868 A1 | 5/2016 | Lovett | |
| 2016/0284125 A1 | 9/2016 | Bostick | |
| 2017/0031433 A1* | 2/2017 | Abou Mahmoud | G06F 3/013 |
| 2018/0129276 A1 | 5/2018 | Nguyen | |
| 2019/0019032 A1 | 1/2019 | Bostick | |
| 2020/0232804 A1* | 7/2020 | Rogan | H04L 67/52 |
| 2021/0252384 A1* | 8/2021 | Li | A63F 13/35 |
| 2022/0262504 A1* | 8/2022 | Bratty | G16H 20/30 |

OTHER PUBLICATIONS

Younis, et al., "A Hazard Detection and Tracking System for People with Peripheral Vision Loss using Smart Glasses and Augmented Reality", (IJACSA) International Journal of Advanced Computer Science and Applications, vol. 10, No. 2, 2019, 9 pgs.

* cited by examiner

*Primary Examiner* — Kyle Zhai
(74) *Attorney, Agent, or Firm* — Edward J. Wixted, III (57) ABSTRACT

A computer-implemented method for utilizing augmented reality (AR) and gamification to help a user traverse an area that includes hazards. The method includes one or more computer processors receiving at an AR device utilized by a user, visual information corresponding to an area. The method further includes identifying one or more hazards within the area. The method further includes determining a path through the area that the user may traverse to avoid the one or more identified hazards. The method further includes generating a plurality of elements of AR content, where at least a first element of AR content indicates the path for the user to traverse. The method further includes displaying, via the AR device, the received visual information corresponding to the area to include the plurality of elements of AR content.

20 Claims, 4 Drawing Sheets

APPLYING AUGMENTED REALITY-BASED GAMIFICATION TO HAZARD AVOIDANCE

BACKGROUND OF THE INVENTION

The present invention relates generally to the field of augmented reality (AR), and more particularly to generating gamified AR content to enable a user to traverse a location that includes hazards.

Augmented reality (AR) is a view of a physical, real-world environment with elements augmented (overlaid) by computer-generated sensory input, such as graphical information, haptic events, auditory, and/or other sensory effects. Generally, augmentation occurs in near real-time and in semantic context with various environmental elements. AR overlays can integrate virtual information (e.g., shapes, colors, text, links to information, computer generated graphics, etc.) within and/or associated to the images or a video stream associated with features within the physical world. Various electronic (e.g., computing) devices can include AR capabilities and/or receive AR content information, such as smartphones, smart glasses, a head-up display, a tablet computer, etc.

In one context, gamification is defined as a set of activities and processes to solve problems by using or applying the characteristics of game elements. Gamification commonly employs game design elements to channel user engagement, improve knowledge retention, stimulate physical exercise, enhance training in new area, etc. Gamification techniques are intended to leverage the natural desires of people for achievement, status, competition, mastery, socializing, learning, self-expression, closure, etc.

Some gamification strategies use rewards for players who accomplish desired tasks or competition to engage players. Types of rewards may include points, achievement badges/levels, the filling of a progress bar, or providing the user with virtual currency. Another approach to gamification is to make existing tasks feel more like games. Some techniques used in this approach include adding a narrative to a task, providing meaningful choices, and/or modifying the experience of the user (i.e., player) to elicit specific actions, or modify the behaviors of a user based on presenting positive and negative cues and/or outcomes.

SUMMARY

According to an aspect of the present invention, there is a computer-implemented method, computer program product, and/or system for utilizing augmented reality (AR) and gamification to help a user to traverse an area that includes hazards. The method includes at least one computer processor receiving, at an augment reality (AR) device utilized by a user, visual information corresponding to an area the user traverses. The method further includes at least one computer processor identifying one or more hazards within the area. The method further includes at least one computer processor determining a path through the area that the user may traverse to avoid the one or more identified hazards. The method further includes at least one computer processor generating a plurality of elements of AR content, wherein the plurality of elements of AR content includes at least a first element of AR content indicating the determined path. The method further includes at least one computer processor displaying, via the AR device, the visual information corresponding to the area to include the plurality of elements of AR content.

DETAILED DESCRIPTION

Embodiments of the present invention recognize that dangerous objects or hazardous conditions can be present at home, along a roadside, a floor of a shopping area, within a warehouse, etc. Embodiments of the present invention also recognize a dangerous object, or a hazard may not remain at a fixed location. For example, a broken bottle can roll, liquids can flow, and object that include stored mechanical or electrical energy can move randomly or in a fixed pattern as the energy is released, such as in a circle or oscillating between two locations. In any surrounding, if there are different types of dangerous object, we might need to safely move through that path despite the area having various dangerous objects in the surroundings. Accordingly, there may be a chance of an accident.

Embodiments of the present invention recognize that there can be more than one dangerous object present within an area. Embodiments of the present invention recognize that in some scenarios a dangerous object can be known and be attractive to an individual, or the dangerous object may be unknown to the individual but the curiosity of the individual may draw the individual towards the dangerous object and may cause an accident and/or injury. In other scenarios, the individual needs to traverse an area having one or more dangerous objects, and the individual may not be attentive to identify and avoid the dangerous objects in the area.

Embodiments of the present invention utilize a device of a user that includes at least a camera, identification capabilities (innate and/or accessible via the Internet), and augmented reality (AR) capabilities to identify hazards within an area that the user is to traverse. As used herein, hazards, threats, and dangerous objects may be used interchangeably based on context. Embodiments of the present invention also monitor a user in a plurality of settings and engaging in various activities to determine behavioral and interest attitudes and/or reactions to determine the likes, dislikes, curiosity, and neutral considerations for various physical (i.e., real) elements, virtual elements (e.g., AR content or virtual reality (VR)), and virtual settings/environments.

Embodiments of the present invention utilize the behavioral and interest information to determine attraction and avoidance responses of the user to hazards within an area to traverse, and the locations of the hazards to determine a "safe" path through the area. Embodiments of the present invention generate AR content to direct or encourage the user to traverse the area that includes hazards along the determined safe path by hiding a hazard with AR content or overlaying a hazard that the user is attracted to or curious about with AR content associated with an aversion or avoidance response. Embodiments of the present invention can utilize at least visual and auditory AR content to elicit responses from the user to elements of the area while the user traverses the area.

Embodiments of the present invention increase the likelihood that the user follows the safe path through the area, embodiments of the present invention further utilize gamification to enhance attraction, aversion, and avoidance behaviors of the user to encourage (e.g., entice) the user follow the determined safe path through the area. Embodiments of the present invention gamify the interaction of the user with the safe path and AR/VR content presented to the user by including various visual or auditory features presented to the user that represent scores, rewards, penalties, tokens, or other features used to reinforce or strengthen the desire of the user to follow the determined safe path. For example, embodiments of the present invention add points or other rewards visually presented to the user in response to the user.

Some embodiments of the present invention also determine mobility information corresponding to the user. Embodiments of the present invention utilize the mobility information associated with a user to modify the rating of a hazard within the area. For example, a region of tar within an area poses a greater threat (e.g., danger) to a user walking barefoot or riding a skateboard than it does to a user wearing hiking boots or riding on a motorcycle.

Further embodiments of the present invention enable devices of two or more users to interact or share knowledge about an area based on different perspectives or fields of view. In one example, each user has a different field of view of the area and can potentially see a hazard that is not visible to another user until the first user nears the hazard. Thus, a wirelessly-enabled AR device of one user can exchange at least hazard information with a wirelessly-enabled AR device of another user. Similarly, embodiments of the present invention can utilize shareable information associated with the area from non-user devices, such as sensors, monitoring devices (e.g., surveillance cameras), and/or IoT devices associated with the area.

The descriptions of the various scenarios, instances, and examples related to the present invention have been presented for purposes of illustration but are not intended to be exhaustive or limited to the embodiments disclosed.

Figure 1:
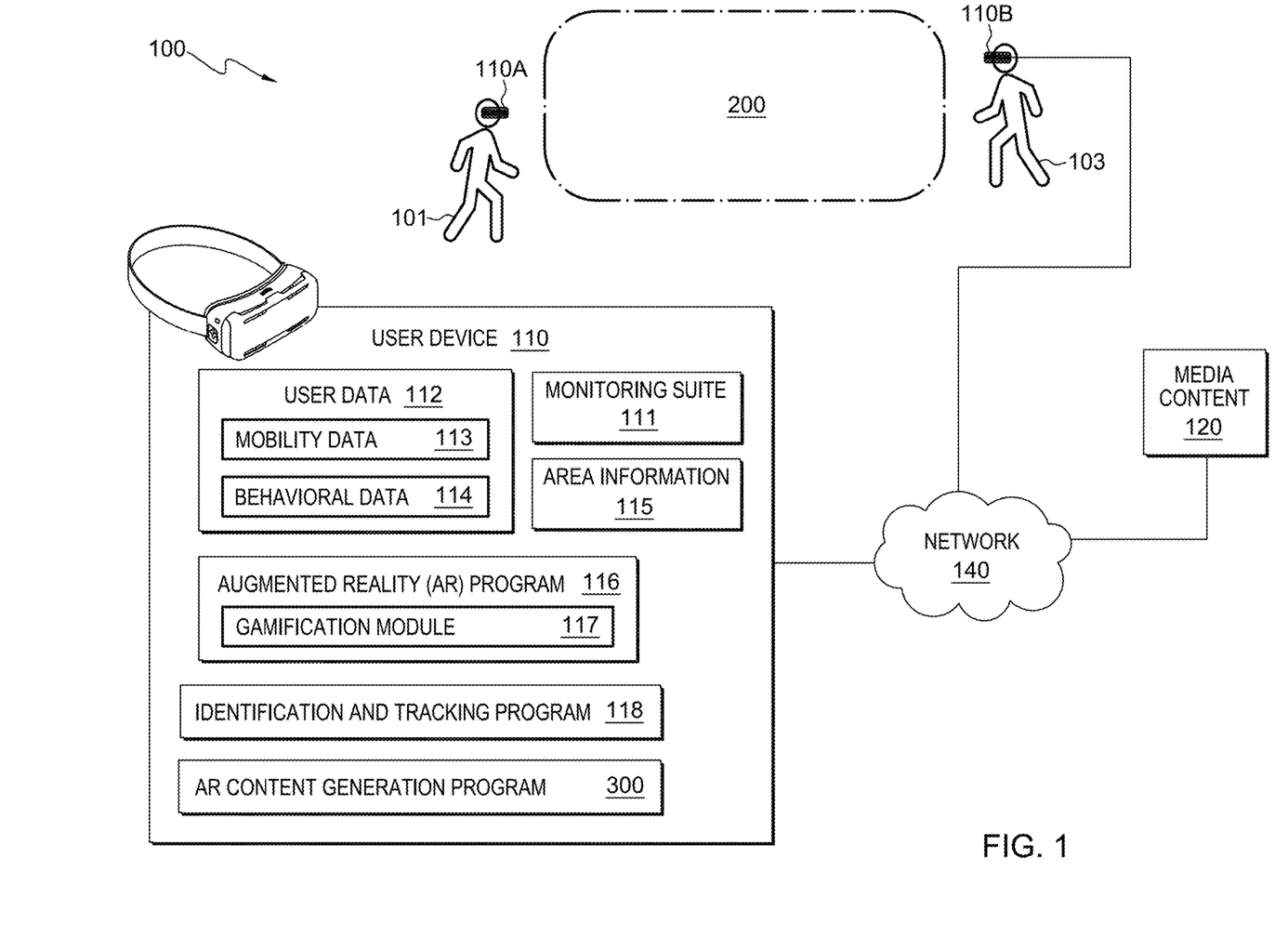
FIG. 1 illustrates a networked environment, in accordance with an embodiment of the present invention.

The present invention will now be described in detail with reference to the Figures. FIG. 1 is a functional block diagram illustrating networked environment 100, in accordance with embodiments of the present invention. In one embodiment, networked environment 100 includes one or more instances of user device 110 respectively associated with a user, such as user device 110A associated with user 101 and user device 110B associated with user 103; media content 120; and area 200. In some embodiments, networked environment 100 includes a singular user and a respective user device 110 (i.e., user 101 and user device 110A), media content 120, and area 200. In various embodiments, user device 110 and media content 120 are interconnected over network 140. In other embodiments, networked environment 100 also includes one or more non-user devices (not shown) associated with area 200, such IoT devices, monitoring devices, and various sensors associated with monitor area 200 and can send data and information to user device 110 via network 140.

In general, instances of user device 110 (i.e., user device 110A and user device 110B) and media content 120 are representative of any programmable electronic device or combination of programmable electronic devices capable of executing machine readable program instructions and communicating via network 140. Instances of user device 110 and media content 120 may include components, as depicted and described in further detail with respect to FIG. 4, in accordance with embodiments of the present invention.

Instances of user device 110 may be AR headsets, smart-glasses, mobile phones, tablet computers, mixed-reality devices, heads-up displays or any programmable computer systems known in the art that a user can carry, use to capture images and/or video, and use to view AR and/or VR content. In the illustrated embodiment of FIG. 1, instances of user device 110 are depicted as an AR headsets. However, user device 110 may be any one of the instances of electronic devices previously described. In addition, some instances of user device 110 may be mounted in a wearable device, such as a headset as opposed to being hand-held by a user. In various embodiments disclosed herein, user device 110 refers user device 110A of user 101.

In some embodiments, user device 110 includes and/or is operatively coupled to one or more hardware features (not shown) that are utilized in association with, monitoring suite 111, AR program 116, identification and tracking program 118, and/or AR content generation program 300. For example, user device 110 may include one or more cameras; a speaker; headphones; a compass and/or an inertial monitoring system to sense a position, orientation, direction of movement, and/or one or more physical actions of a user; and/or one or more visual output devices, such as a one or more displays, an AR headset, smart glasses, a heads-up display, a virtual retinal display, etc. In a further embodiment, user device 110 also includes hardware that can generate haptic events, kinesthetic effects, force-feedback (e.g., a resistance effect).

In an embodiment, user device 110 includes monitoring suite 111, user data 112, area information 115, augmented reality (AR) program 116, identification and tracking program 118, AR content generation program 300, and a plurality of programs and data (not shown). Examples of other programs and data may include global positioning system (GPS) software, a web browser, a camera/video application, wireless communication software, etc.

Monitoring suite 111 includes a plurality of local and/or network-accessible (e.g., Internet-based) programs that monitor various aspects of the mindset, tendencies, preferences, and behaviors of a user (e.g., user 101) with respect to various identified objects, activities, situations, and environments. Examples of programs that monitoring suite 111 may include are a cognitive program, a natural language processing (NLP) program, an image recognition program, a video analysis program, an audio analysis/recognition program, image recognition software, cognitive apps, a content/website analysis program, a machine leaning program, various analytical programs, etc. Monitoring suite 111 stores determined information associated with the user among user data 112, mobility data 113, and behavioral data 114 based on the type of information determined. Some information may be stored in more than one location. In an example, monitoring suite 111 determines information that is temporarily stored within mobility data 113 but is transferred to behavioral data 114 after user 101 traverses area 200 and related contextual and/or behavioral information related to traversing area 200 is determined.

In various embodiments, monitoring suite 111 sources information from media content 120 and/or the Internet to perform various identifications and determinations, such as object identification or emotion recognition. In some scenarios, monitoring suite 111 analyzes activities of a user interacting with various physical environments (not shown), such playing outdoors, traversing a shopping mall, etc., to determine a plurality of behaviors associated with the user. In other scenarios, monitoring suite 111 analyzes activities of the user with respect to other environments or situations, such as watching movies, playing a video game, browsing the Internet, playing on-line games, accessing educational or informational content via recorded media and/or the Internet. In one example, monitoring suite 111 determines the level of curiosity, attraction, or aversion of the user with respect to various living creatures, such as biting insects, reptiles, birds, foxes, frogs; habitats/conditions, such as swamps, muddy areas with stagnant water; weather conditions; etc. In another example, monitoring suite 111 determines the level of curiosity, attraction, or aversion of the user with respect to various themes/settings, such as fictitious creatures, fantasy animals, monsters, alien races, futurist environments, etc.

In other embodiments, monitoring suite 111 can also infer a frame of mind or attitude of the user based on information obtained from various aspects of user device 110. In one example, monitoring suite 111 may infer that user 101 is bored based on determining that user 101 is moving slowly and shuffling along. In another example, monitoring suite 111 may infer that user 101 is highly active but distracted based on aspects of user device 110 determining that movements of user 101 are chaotic and the user is switching between movement modes, such as skipping, walking, running. In yet another example, monitoring suite 111 may utilize a camera facing user 101 to obtain a facial expression of user 101 and infer an emotion or reaction of user 101 to a particular situation or element that user 101 notices.

User data 112 may include personal, demographic, and physical information, location-based, and/or culture-based information associated with a user. User data 112 also includes mobility data 113 and behavioral data 114. As used herein, historic data and information refers to data and information associated with a user and areas that the user encountered/traversed prior to the user encountering the current instance of area 200.

In some embodiments, user data 112 also includes other information associated with the user that is utilized by gamification module 117, such as scores, reward/token inventory, relative scoring values (i.e., points) related to positive and negative reinforcement conditions. For example, user data 112 includes values associated with following or interacting with a safe-path AR element, and a penalty values for approaching a hazard or not responding to an gamification signal/AR content used to dissuade the user away from a given location.

In a further embodiment, user data 112 includes information that another individual, such as an adult loads into user data 112 for use by gamification module 117. For example, an adult may load a preset quantity of tokens for a game the user 101 plays into user data 112 and assigns a point conversion value, such as 50 points=1 game token. Thereby, further incentivizing user 101 to follow the safe path by interacting or avoiding AR/VR content related to area 200.

Mobility data 113 includes information, current and historic, mobility data of a user respectively associated with the user executing a mode of movement, one or more physical capabilities and/or limitations (e.g., a stride length of the user, a speed of movement, a reaction time of the user, recovering from an injury). Modes of movement by the user include walking, running, skipping, bicycling, skateboarding, roller blading, walking utilizing crutches, etc. Mobility data 113 also includes information relate to a level/rating of expertise or capability of a user with various modes of movement, such as skateboard=beginner, balance=fair, coordination=average, confidence=poor. Mobility data 113 can also include information related to the clothing and footwear worn by the user. For example, monitoring suite 111 utilizes a camera of user device 110 to determine that in one instance the user is wearing flipflops, shorts, and a tee-shirt; in another instance the user may be wearing dress cloths and hard-soled shoes.

In various embodiments, information within mobility data 113 is periodically updated based on one or more analyses performed by monitoring suite 111. For example, as user 101 practices or executes a mode of movement, monitoring suite 111 updates mobility data 113 as the user improves. Similarly, if monitoring suite 111 determines that a user has been injured or is carrying an awkward/heavy object, then monitoring suite 111 downgrades one or more capabilities of user 101, such reducing balance and reaction time ratings.

Behavioral data 114 includes a plurality of information of a user associated with attitudes/reactions, such as like, dislike, aversion, revulsion, fright (e.g., a phobia), curiosity, etc., with respect to various sights, sounds, objects, environments, and/or situations. Examples of the use of behavioral information and responses is described if further detail with respect to the illustrative example associated with FIG. 2. In an embodiment, behavioral data 114 also include weight factors for modifying positive/negative score values and/or rewards/penalties to increase the probability (e.g., likelihood) that the user responds to an AR/VR element and/or hazard in a manner that improves the safety of the user. For example, if a user is risk averse then weight factors applied to penalties are increased. In some embodiments, behavioral data 114 include information regarding environment/situation combinations most likely to affect/influence the user to follow a determined safe path and avoid hazards within particular instances of area 200.

Embodiments of the present invention utilize various data sources, such as user data 112, mobility data 113, and behavioral data 114, which may include storage devices and content associated with the user accessible via user device 110. In example embodiments, instances of monitoring suite 111, identification and tracking program 118, and AR content generation program 300 allow the user to opt-in or opt-out of exposing types and categories of information. Instances of monitoring suite 111, identification and tracking program 118, and AR content generation program 300 enable the authorized and secure handling of user information, such as location information and behavioral information, as well as types and categories of information that may have been obtained, is maintained, and/or is accessible. In another example, a user opts-in to allow monitoring suite 111 to log user actions or behavioral information but to anonymize the ID of the user that logged a decision, updated a status, or performed one or more actions. The user can be provided with notice of the collection of types and categories of information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Area information 115 includes a plurality of information associated with area 200 determined by various programs and features of user device 110, such as a contextual description of area 200 (e.g., a store, a park); a list of elements or objects within area 200; elements within area 200 designated as hazards; a type and severity of a designated threat; a static map of area 200 (e.g., fix elements); a dynamic map of area 200, such as the position and direction of movement of user 101, the locations of moving elements (e.g., people, hazards, equipment), environmental conditions within area 200, etc.

AR program 116 is an augmented reality program that renders, adds, and/or overlays AR and/or VR content (e.g., scenery, avatars, entities, creatures, stimuli, and elements) selected and/or generated by AR content generation program 300 within a video feed obtained by a camera (not shown) associated with user device 110. AR program 116 may also incorporate audio files and/or sound effects in conjunction with presenting visual AR/VR content to a user. In some embodiments, AR program 116 can generate more advanced AR/VR content based on the capabilities of user device 110, such as including haptic events, force-feedback responses, kinesthetic effects, etc. In some cases, AR program 116 operates as a mixed reality program.

In an embodiment, AR program 116 also includes gamification module 117 that enables the further modification and augmentation the presentation of AR/VR content and auditory elements to the user to encourage, influence, persuade, and/or stimulate the user to avoid hazards and safely move through an area based on gamifying the interactions of the user of user device 110 in response to the AR/VR content applied within the field of view of the user with respect a given instance of area 200 and related hazards and other elements.

Gamification module 117 determines a set of visual and audio elements, such as a score board, a token or reward inventory, presentation of points (positive or negative) based on user interactions with a suggested path or a set of instructions to avoid hazards, or that the user deviates from the suggested path and/or approaches a hazard. Gamification module 117 utilizes information included within user data 112 and behavioral data 114 to determine scoring, rewards, penalties, and response elements or stimuli that will help or encourage the user to safely traverse an instance of area 200. Gamification module can adjust rewards/penalties values based on the severity of threat to the user and how quickly a user responds to AR/VR content.

In various embodiments, gamification module 117 interfaces with AR content generation program 300 and/or AR program 116 to assess penalties and rewards to user 101 based on the actions of user 101 with respect to AR/VR content, traversing an indicated path, and avoiding or bypassing a hazard. For example, gamification module 117 may determine that a small deviation from the determined safe path results in a minor score reduction and a sound of disappointment, such as "tisk-tisk." Whereas, gamification module 117 may assess a larger penalty for moving towards a hazard. In response to the user continuing to approach the hazard, gamification module 117 may determine to have a new AR/VR entity appear and remove or consume a reward/token from the inventory of the user and add additional token consuming entities between the user and the hazard indicating that attempting to interact with a hazard increases the penalties associated with improperly traversing the current area. Alternatively, gamification module 117 determines rewards for user 101 traversing the "safe" path and interacting with AR/VR elements associated with the "safe" path.

Identification and tracking program 118 is a program that utilizes the imaging capabilities of user device 110 to scan, map, and identifies elements of an area (i.e., area 200) prior to a user (i.e., 101) entering the area, such as other people, displays, objects on the floor, equipment used by workers in the area, etc. Identification and tracking program 118 shares determined information with various aspects of the current invention, such as gamification module 117 and/or AR content generation program 300. Identification and tracking program 118 can also access mobility data 113 or interface with monitoring suite 111 to determine movement-related information associated with user 101, such as a movement mode, orientation, direction In an embodiment, identification and tracking program 118 utilizes one or more sources of information and images for various determinations. In one example, identification and tracking program 118 accesses media content 120 and/or the Internet to determine whether an element within area 200 poses a danger to user 101. In addition, identification and tracking program 118 can determine that an element within area 200 is moving and can track an element to predict a path of further position for the element. Identification and tracking program 118 can also determine one or more hazards associated with a dangerous element and a degree or severity of a threat a given hazard posed to the user. Hazards and associated threats (e.g., types of physical/bodily harm to a user) include, but are not limited to, broken objects with edges that can cut and/or protrusions that can pierce; objects or areas at a temperature (e.g., hot or cold) that can cause injury; objects store a chemical or are leaking contents (e.g., liquid, granules, powder); areas of a different surface characteristic that can contribute to a fall, such as liquid covered, sticky, irregular, consisting of or covered with a loose material; an object that includes electrical or potential energy, such as a damaged light fixture or a tall stack of cans; etc.

Still referring to identification and tracking program 118, in various embodiments identification and tracking program 118 also monitors the location and direction of movement of the user as the user traverses the area (e.g., area 200). For example, if user device 110 includes other features for determining location and/or orientation of the user, such as an inertial positioning system, then identification and tracking program 118 also utilizes these features to monitor the location, orientation, and a direction of travel of user 101 while traversing area 200.

AR content generation program 300 is a program that determines and generates a plurality of AR/VR elements (visual and auditory stimuli) utilized to encourage a user (i.e., user 101) to safely traverse an area (e.g., area 200) based on information associated with the user included within at least user data 112 and behavioral data 114 (discussed in further detail with respect to FIG. 3); and presented to the user via AR program 116. AR content generation program 300 interfaces with identification and tracking program 118 to assess an area (i.e., area 200) to identify a plurality of elements within the area, determine the location and nature of hazards within the area, and determine a safe path through the area. Subsequently, AR content generation program 300 utilizes information associated with the user included within user data 112 and behavioral data 114 and interfaces with gamification module 117 to determine a theme, a set of AR/VR elements to employ, and related rewards and penalties to apply to actions of a user to encourage the user to traverse a "safe" path through area 200.

Media content 120 is representative of a library; database; and/or collections of media files (e.g., content) accessible via the Internet, such as real-life images, videos, animated images, sound effects, cartoon images, icons, etc. In an embodiment, media content 120 also includes descriptions, models, and/or parameters for generating computer-generated imagery (CGI), such as AR/VR entities, scenery, elements, and other content that AR content generation program 300 generates and/or selects; and is rendered, for presentation to the user, utilizing AR program 116.

Media content 120 also includes images and audio files utilized by gamification module 117 to affect the behavior of a user (i.e., user 101). Access to certain portions of media content 120 may be based on whether media files are identified for public use or licensed by an aspect of the present invention. In some embodiments, media content 120 can further include images, videos, and/or descriptions that are utilized by one or more programs, such as monitoring suite 111 and identification and tracking program 118 to identify objects; hazards; a condition of an object; identify a characteristic of a surface (e.g., smooth, wet, rough, jagged, damaged); a potential for movement by an object; objects that may store energy; etc.

Network 140 can be, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, network 140 can be any combination of connections and protocols that will support communications between instances of user device 110, media content 120, and/or the Internet, in accordance with embodiments of the present invention. In various embodiments, network 140 operates locally via wired, wireless, or optical connections and can be any combination of connections and protocols (e.g., personal area network (PAN), Bluetooth®, near field communication (NFC), laser, infrared, ultrasonic, etc.). In some embodiments, network 140 enables other non-user devices (not shown) to communicate data to user device 110.

Area 200 may represent a physically bounded area, such as a room, an isle within a store; a geo-fenced area within a larger area; and/or a dynamically-defined area within a proximity value (e.g., distance) of a user and an instance of user device 110, such as user 101 and user device 110A and/or user 103 and user device 110B. Area 200 can include one or more hazards; a plurality of structural elements (not shown), such as shelves, kiosks, railings, etc.; other individuals; natural features; equipment used within area 200; and other elements/objects related to the location of area 200, such as merchandise within a store; etc. Examples of some hazards that area 200 may include are described in further detail with respect to FIG. 2.

Figure 2:
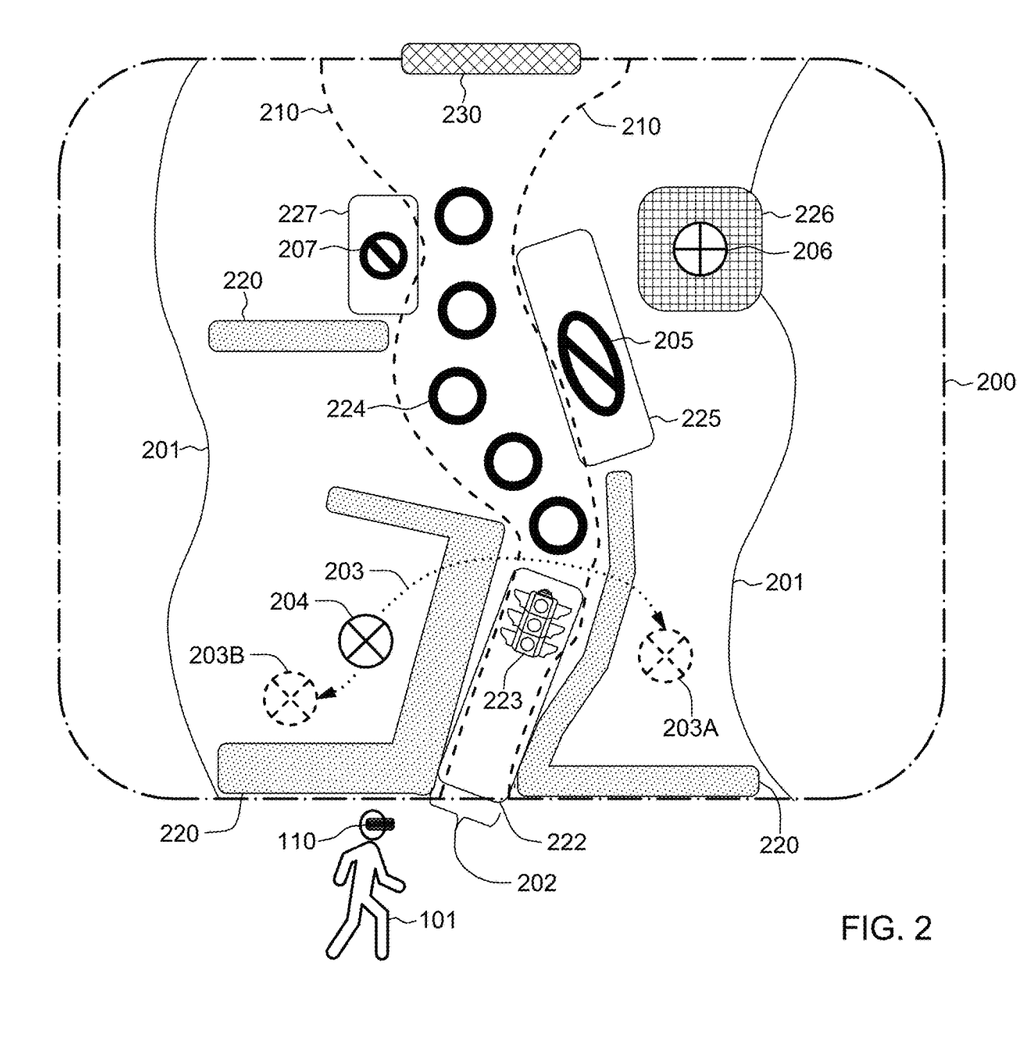
FIG. 2 an illustrative example of an area including hazards and augmented reality content to, in accordance with an embodiment of the present invention.

FIG. 2 is an illustrative example of user 101 utilizing user device 110 and AR content generation program 300 to safely traverse an instance of area 200 that includes four hazards (i.e., hazard 204, hazard 205, hazard 206, and hazard 207), in accordance with embodiments of the present invention. In following example embodiment, AR content generation program 300 determines, based on behavioral data 114 corresponding to user 101 to utilize two themes/stratagems to determine and generate elements of AR and/or VR content to encourage user 101 to safely traverse area 200 and discourage user 101 from approaching hazard 204, hazard 205, hazard 206, and hazard 207. AR content generation program 300 determines to utilizes natural setting as a primary theme in association with other hazards and encouraging user 101 to remain within "safe" path 210. AR content generation program 300 determines to utilizes a different theme in association with hazard 204.

In addition, AR content generation program 300 also utilizes various gamification principals, implemented using gamification module 117 to respond to various actions of user 101 with various elements of AR/VR content while traversing area 200. In the illustrative embodiment, AR content generation program 300 determines to includes a plurality of AR/VR elements, such as AR element 220, AR element 223, and the five instances of AR element 224, which encourage user 101 to safely traverse area 200 by remaining within "safe" path 210.

In the illustrative embodiment, AR content generation program 300, executing on user device 110, utilizes identification and tracking program 118 to determine, in near real-time, the position and orientation of user 101 with respect to area 200, and whether one or more elements within area 200 pose a threat to user 101. For example, identification and tracking program 118 identifies that area 200 includes four hazards (i.e., hazard 204, hazard 205, hazard 206, and hazard 207). In addition, identification and tracking program 118 also determines a location and other information related to hazard 204, hazard 205, hazard 206, and hazard 207, such as a type of threat (i.e., danger), a degree of danger or potential injury that a respective hazard can pose to user 101; whether a hazard is moving; and whether the path of a moving hazard is predictable. For example, identification and tracking program 118 determines that hazard 204 (circle with diagonal cross) repetitiously traverses path 203 between endpoints 203A and 203B.

In an illustrative embodiment, solid lines 201 indicate a physical boundary, such as walls or shelving within area 200. Safe path 210 is associated with the area between dashed lines that span area 200 as determined by AR content generation program 300. AR content generation program 300 determines an optimal entry area indicated by entry location 202 and an optimal egress location 230 (diagonal-hatched area). "Optimal" may refer to a condition that gamification module 117 determines to award the most points or rewards to user 101 for following or interaction with a portion of safe path 210. AR content generation program 300 may depict at least a portion of the area of safe path as clean water and may include other ancillary AR/VR content, such as fish swimming below the surface.

In an embodiment, AR content generation program 300 determines, based on behavioral data 114, that user 101 has an aversion response to swampy areas, which AR content generation program uses as a primary theme. In response, AR content generation program 300 downloads swamp-related images and entities from media content 120 and instructs AR program 116 to render the muddy swampy images within the instances of AR element 220 (speckle-filled areas) to influence user 101 to enter area 200 at entry location 202. If user 101 approaches within a threshold distance of an instance of AR element 220, then AR content generation program 300 includes AR content of flying biting insects (not shown) approaching user 101. If user 101 continues to approach an instance of AR element 220, then AR content generation program 300 adds insect noises (e.g., auditory elements) and instructs gamification module 117 to deduct points from the score of user 101 until user 101 moves away from the instance of AR element 220.

In the illustrative embodiment, identification and tracking program 118 determines that hazard 204 is a moving hazard and determines approximates the speed of hazard 204 at one or more positions (not shown) along path 203. In response, AR content generation program 300 determines to utilize a different theme, based on the interest of user 101 in drag-racing. AR content generation program 300 determines to utilize this theme and a Stop/Go stratagem to enable user 101 to safely cross path 203 of hazard 204.

In the illustrative example, AR content generation program 300 accesses media content 120 to obtain images of a staging area with starting-line (AR element 222) and AR element 223 (i.e., represented by a stoplight icon) depicts a "tree" of status and count down lights. Based on the location of user 101 and the position of hazard 204 along path 203, AR content generation program 300 utilizes AR program 116 to dynamically control the depiction of the status lights of AR element 222 by illuminating the red lights when hazard 204 poses a threat to user 101, illuminating the yellow light for user 101 to prepare to move forward, and to illuminate a green light when it is safe for user 101 to proceed.

In addition, gamification module 117 responds to the actions of user 101. In one example, gamification module 117 awards a series of small score values while user 101 remains behind the starting-line while AR element 223 depicts a red or yellow status lights. A larger positive scoring value is applied to the score of user 101 in response to user 101 moving forward when the green status light is illuminated. If user 101 does not move forward at the illumination of the green status light, then AR content generation program 300 may further indicate for user 101 to move by producing a cheering sound. In another example, if user 101 does not stop moving prior to approaching the starting-line, AR generation program 300 instructs gamification module 117 to assess penalties (e.g., a negative gamification interaction) to the score of user 101 based the actions of user 101, the location of hazard 204, and behavioral data 114.

In addition, AR content generation program 300 instructs AR program 116 to render the first instance of element 224 (doughnut shape) at a distance beyond path 203 to ensure that user 101 is safe from hazard 204. For example, instances of element 224 may be depicted as giant lily pads. In response to generating a yellow status signal light within AR element 223, AR content generation program 300 also instructs AR program 116 to render as smaller lily pad with a frog avatar (not shown). In response, AR content generation program 300 changing AR element 223 to depict a green status light, AR program 116 jumps the frog avatar to the first instance of AR element 224, which flashes a lighter shade of green. If user 101 moves from AR element 222 to the first instance of AR element 224, AR element 224 lights up again and gamification module 117 awards points to the score user 101.

In response to AR generation program 300 determining that user 101 moves to a subsequent instance of AR element 224, that instance of AR element 224 lights up and gamification module 117 awards additional points (e.g., positive gamification feedback) to the score of user 101. AR content generation program 300 can utilize the frog avatar to encourage user 101 to proceed forward through area 200, such as having gamification module 117 award points for user 101 trying to catch the frog avatar as the frog moves to the next giant lily pad (i.e., instance of AR element 224). In an example, AR content generation program 300 may determine to depict egress location 230 as a dry grassy area beyond an arc of trees.

In the example embodiment, AR generation program 300 utilizes identification and tracking program 118 to determine that hazard 205 (rotated oval-backslash symbol) represents stationary hazard that can increase in area over time, such as a broken glass jar of a foodstuff that is at least semi-liquid. Behavioral data 114 indicates that hazard 205 elicits a neutral attitude from user 101. In response, AR generation program 300 determine that AR element 225 (unshaded area) is an animated/dynamic AR/VR content element that elicits at least an threat avoidance response and potentially a fear response in user 101, such as an alligator that watches user 101 to move user 101 away from hazard 205. AR generation program 300 determines to adjust the size on position of AR element 225 based on identification and tracking program 118 determining the spread (e.g., change of area) of hazard 205. If user 101 approaches AR element 225, then AR generation program 300 instructs AR program 116 to animate AR element 225 to become more threatening based on the proximity of user 101. In addition, AR generation program 300 instructs gamification module 117 to assess penalties to user 101 based the duration and distance of approach of user 101 to hazard 205.

AR content generation program 300 determines that hazard 206 (circle with an orthogonal cross) is a currently stationary hazard, such as rolling ladder to access inventory on the top of a set of shelving that stimulates the curiosity of user 101 based in information included within behavioral data 114. AR content generation program 300 instructs AR program 116 to hide, conceal, or camouflage hazard 206 from the view of user 101 by rendering AR element 226 (cross-hatched area) as a large moss-covered tree surrounded by water.

AR content generation program 300 determines, based on behavioral data 114, that hazard 207 (circle-backslash symbol) represents stationary hazard comprised of scattered pieces that are of a high interest to user 101, such as marbles or gumballs. AR content generation program 300 determines that gamification module 117 will utilize a token/reward consuming entity strategy to discourage user 101 from approaching hazard 207. For example, AR element 227 may depict a nest of long-beaked birds that peck at user 101. If user 101 approaches within a threshold distance of hazards 207, AR content generation program 300 utilizes AR program 116 and gamification module 117 to have a bird peck at and remove a token from the inventory pouch (not shown) of user 101 and fly away through egress location 230. Because AR element 227 depicts multiple birds, AR content generation program 300 maintains the disincentive (e.g., negative gamification feedback) for user 101 to approach hazard 207.

Figure 3:
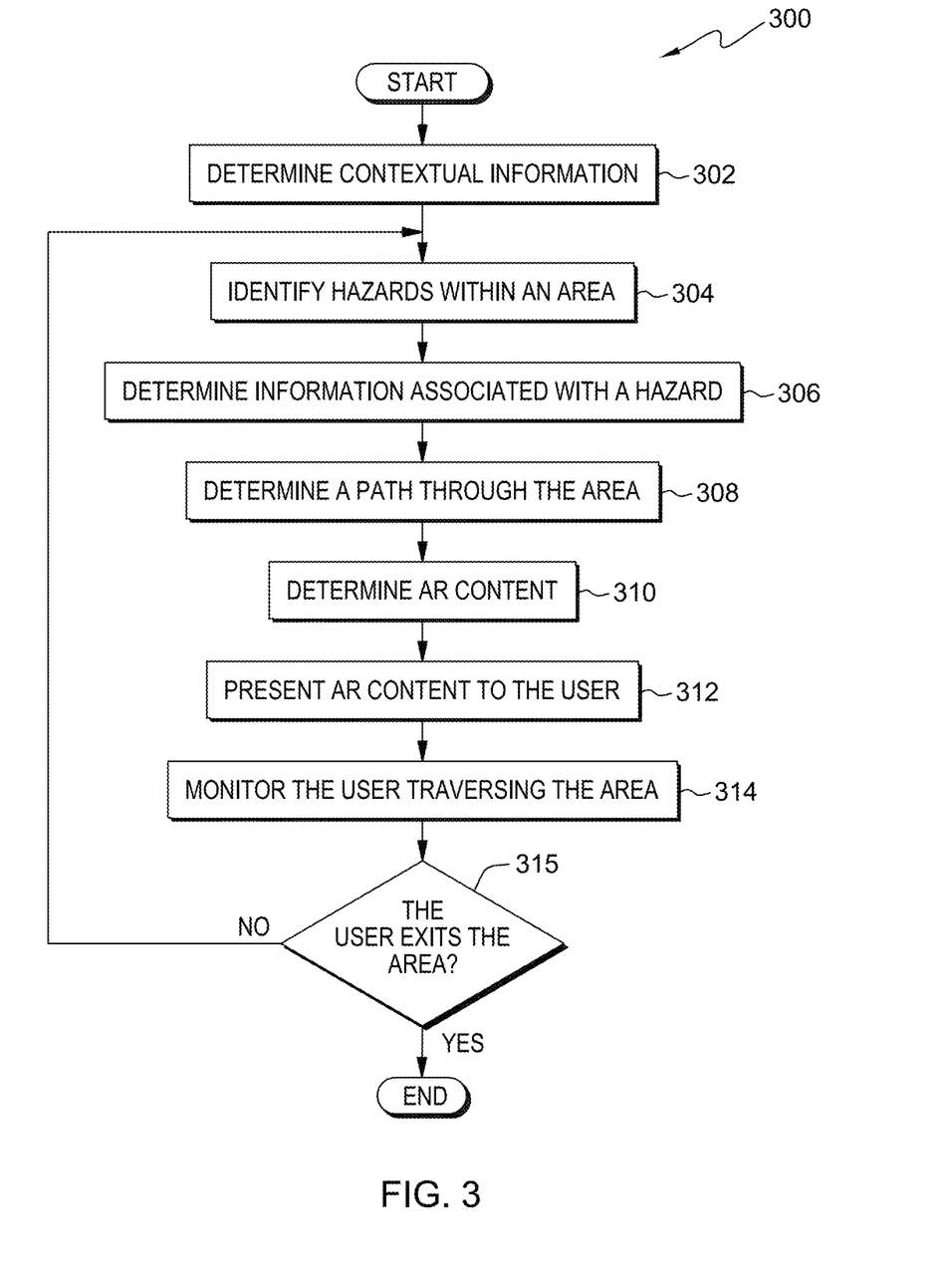
FIG. 3 depicts a flowchart of steps of an augmented reality content generation program, in accordance with an embodiment of the present invention.

FIG. 3 is a flowchart depicting operational steps for AR content generation program 300, a program that identifies hazards within an area based on visual information received from a device of a user, and in response generates elements of AR and/or VR content to enable the user to safely traverse the area, in accordance with embodiments of the present invention. In various embodiments, AR content generation program 300 utilizes known behaviors and attitudes of the user, various gamification methods, strategies, and psychological principals to encourage the user to follow the "safe" path through an area by responding to the generated AR/VR elements embedded within the field of view of the device of the user.

In step 302, AR content generation program 300 determines contextual information. AR content generation program 300 determines contextual information related area 200 based on information determined by user device 110, such as a location; a type of area (e.g., an outdoor setting, an outdoor venue, a department store, a hypermarket); a level of activity in the area, such as high traffic, busy but sparely populated, slow-paced and moderately populated, etc. AR content generation program 300 can also utilize user device 110 to determine environmental conditions within area 200, such as an illumination level, a temperature, visual conditions (e.g., clear, hazy), a presence of moisture; air flow/wind that can move or destabilize objects; etc. AR content generation program 300 utilizes aspects of user device 110, monitoring suite 111, and/or identification and tracking program 118 to map the layout the current instance of area 200 and create a list of elements (e.g., objects associated with the area, other individuals in the area, objects of the other individuals, elements entering or leaving area 200) within the field of view of user device 110. AR content generation program 300 stores information related to area 200 within area information 115.

Another aspect of AR content generation program 300 determines contextual information associated with the user (i.e., user 101) utilizing monitoring suite 111, such as clothing, footwear, and a mode of movement based in information within mobility data 113; and inferring a frame of mind of user 101 prior to user 101 entering area 200. In some embodiments, AR content generation program 300 utilizes contextual data related to area 200 and information included within user data 112 and/or behavioral data 114 to determine other contextual data related to user 101 traversing area 200, such as attitudes (e.g., like, dislike, curious, neutral) respectively associated with various kinds of objects (e.g., elements) commonly found within the current instance of area 200. In a further embodiment, AR content generation program 300 determines other contextual information based on information received from devices different from user device 110, such as IoT devices of 200 and/or other devices, such as user device 110B of user 103.

In step 304, AR content generation program 300 identifies hazards within an area. In an embodiment, AR content generation program 300 utilizes one or more aspects of user device 110, identification and tracking program 118, and/or monitoring suite 111 to update the map and list elements associated with area 200 stored within area information 115. Subsequently, AR content generation program 300 utilizes other aspects of identification and tracking program 118 to determine the elements of area 200 that are further designated as hazards. In one example, identification and tracking program 118 indicates to AR content generation program 300 whether an object is intact or broken. In another example, identification and tracking program 118 indicates to AR content generation program 300 locations within area 200 where a surface characteristic of the floor changes, such as identifying dry areas, wet areas, sticky areas, etc.

In some embodiments, AR content generation program 300 adds or removes a hazard from among the identified hazards from various determinations based on information associated with the user and the current instance of area 200, such as information included within user data 112 and/or mobility data 113. For example, if user 101 is wearing hiking boots, then AR content generation program 300 may determine that liquid or loose material on the floor of area 200 is not a hazard. Alternatively, if user 101 is walking with the assistance of crutches, then AR content generation program 300 determines that liquid or loose material on the floor of area 200 is a hazard. In a further embodiment, AR content generation program 300 identifies one or more other hazards utilizing information from other device within or in proximity to area 200, such as user device 110B and/or IoT devices associated with area 200. For example, based on user device 110B exchanging or sharing information with user device 110A, AR content generation program 300 can identify hazards that are not visible from the perspective of user device 110A.

In step 306, AR content generation program 300 determines information associated with a hazard. In an embodiment, AR content generation program 300 further utilizes identification and tracking program 118 and/or accesses the Internet to determine information respectively associated with each identified a hazard, such as a type of threat posed by a hazard (e.g., cutting, piercing, tripping, slipping, sticking, electrical shock, kinetic energy, a release of potential energy, thermal, structural failure). In another embodiment, AR content generation program 300 further utilizes identification and tracking program 118 to determine a pattern of motion (e.g., positions and speeds) associated with a hazard that is moving.

In various embodiments, AR content generation program 300 also determines a reaction or attitude of user 101 to a hazard based on information included within user data 112 and/or behavioral data 114. In one example, AR content generation program 300 determines whether user 101 will naturally avoid one hazard based on known dislikes, aversions, and attitudes. In another example, AR content generation program 300 determines that user 101 is attracted to another hazard and a corresponding level of attraction to the other hazard based on known likes, interests, attitudes, curiosity, etc. In addition, AR content generation program 300 may bias hazard interest determinations based on an inferred frame of mind of user 101, such as bored, overexcited, hot and inattentive, etc.

Still referring to step 306, in a further embodiment AR content generation program 300 further utilizes information included within user data 112, behavioral data 114, and information related to a threat level of a hazard to assign a range of rewards, penalties, and/or other responses that gamification module 117 assesses to user 101 based on approaching or avoiding a given hazard within area 200.

In step 308, AR content generation program 300 determines a path through the area. Based on information associated with user 101, hazards within area 200, and other elements within area 200, AR content generation program 300 determines a "safe" path through area 300. In various embodiments, AR content generation program 300 segments or dynamically updates the path through area 200 based on the position of user 101 within area 200 and changes that occur within area 200, such as other individuals entering area 200, a moving hazard not following a predicted track, an employee moving product into area 200 blocking a portion of area 200, or information received from another device (e.g., user device 110B).

In some embodiments, AR content generation program 300 can determine branching paths and/or an alternative path through area 200. In response, AR content generation program 300 instructs gamification module 117 to adjust reward/penalty assessments based on attributes associated with each path or branch, such as width, distance from a hazard, user interactions with non-hazardous elements of area 200, etc. In addition, AR content generation program 300 can determine a path through area 200 based on a stratagem of including additional AR/VR elements to encourage user 101 to move toward or interact with "liked" AR/VR elements, avoid "disliked" AR/VR elements that are associated with, and/or ignore a camouflaged a hazard.

In step 310, AR content generation program 300 determines AR content. AR content generation program 300 may access media content 120 to select and download AR/VR visual content, audio content, and/or parameters and models for CGI elements for various purposes, such as hiding a hazard from user 101, overlaying content on a hazard to elicit an avoidance response from user 101, indicate a path to follow, overlay content to encourage user 101 to stay on the indicated path, etc. In some embodiments, AR content generation program 300 utilizes information within behavioral data 114 to determine the AR/VR content to obtain from media content 120 that is utilized by gamification module 117 to affect the actions and responses of user 101 while traversing area 200. For example, AR content generation program 300 may determine that user 101 is affected more by flashy special effects and interacting with avatars and characters as gamification effects as opposed to high scores and collecting tokens.

In an embodiment, AR content generation program 300 determines AR/VR content utilized to encourage user 101 to utilize safe path 210 and avoid hazards based on information included within user data 112, mobility data 113, and/or behavioral data 114 and the list and map of elements of the current instance of area 200 included within area information 115. Examples of content determined by AR content generation program 300 were previously discussed with respect to various aspects of FIG. 2. In addition, AR content generation program 300 utilizes information within user data 112 and behavioral data 114 to determines one or more themes to use to structure the selection and placement of AR/VR content to enable user 101 to safely traverse area 200. In one example, if the inferred mental state of user 101 is bored, then AR content generation program 300 determines to use larger, flashier, more aggressive AR/VR content to engage and affect the actions of user 101. In another example, if the inferred mental state of user 101 is attentive and upbeat, then AR content generation program 300 determines to use interest specific, more complex AR/VR content to engage and affect the actions of user 101, such as searching for different types coins or species of butterflies to complete a collection as part of an assignment.

In step 312, AR content generation program 300 presents AR content to the user. AR content generation program 300 utilizes AR program 116 to present (i.e., render) a plurality of AR/VR content elements via user device 110. AR content generation program 300 can instruct AR program 116 to render AR/VR content at various positions within area 200, such as in proximity to a hazard, to conceal a hazard, distributed to indicate a path through area 200, and/or distract user 101 in another direction. In some embodiments, AR content generation program 300 utilizes gamification module 117 to add scoring and other gamification features for presentation by AR program 116, such as including avatars, applying special effects to elements of AR/VR content, penalizing user 101 by reducing a score or removing a token or reward within the inventory of user 101. In various embodiments, AR content generation program 300 dynamically updates the content presented to user 101 based interacting with or avoiding given items of AR/VR content. AR content generation program 300 can also utilize AR program 116 and/or user device 110 to generate other stimuli or gamification effects, such as adding audio elements, haptic events, kinesthetic effects, etc.

In step 314, AR content generation program 300 monitors the user traversing the area. AR content generation program 300 utilizes identification and tracking program 118 to determine the position of user 101 with respect to the determined path and the identified hazards. In addition, AR content generation program 300 utilizes identification and tracking program 118 or AR program 116 to determine whether user 101 approaches or interacts with one or more elements of AR/VR content. In various embodiments, AR content generation program 300 interfaces with gamification module 117 to affect the behavior of user 101 based on the location of user 101 within area 200, such as in response to user 101 straying from safe path 210 and/or approaching a hazard. In some embodiments, AR content generation program 300 switches between step 314 and step 312 as opposed to executing decision step 315.

In decision step 315, AR content generation program 300 determines whether the user exits the area. In an embodiment, AR content generation program 300 determines that user 101 exits area 200 based on a map of area 200 generated in response to user 101 entering area 200. In another embodiment, AR content generation program 300 determines that user 101 remains within area 200 (i.e., does not exit the area) based on a map of area 200 generated in response to user 101 entering area 200. In some embodiments, AR content generation program 300 determines that user 101 does not exits area 200 based on determining that area 200 extends beyond the map of area 200 generated in response to user 101 entering area 200. For example, based on the initial vantage point or field of view of user device 110 AR content generation program 300 determined that area 200 was a first size. However, in response to user 101 traversing area 200, AR content generation program 300 subsequently determines from another vantage point that area 200 is of a second size larger than the first size.

In one embodiment, responsive to determining that the user does not exits the area (No, branch, decision step 315), AR content generation program 300 loops to determine whether another hazard is identified (in step 304). For example, referring to FIG. 2, user device 110 did not image hazard 207 from entry location 202. However, in response to user 101 proceeding beyond the hazard path 203 user device 110 can image hazard 207 for identification by identification and tracking program 118. In some embodiments, AR content generation program 300 loops and skips one or more steps based on the position of the user within area 200 previously determined in step 314.

Referring to decision step 315, responsive to determining that the user exits the area (Yes, branch, decision step 315), AR content generation program 300 terminates.

Figure 4:
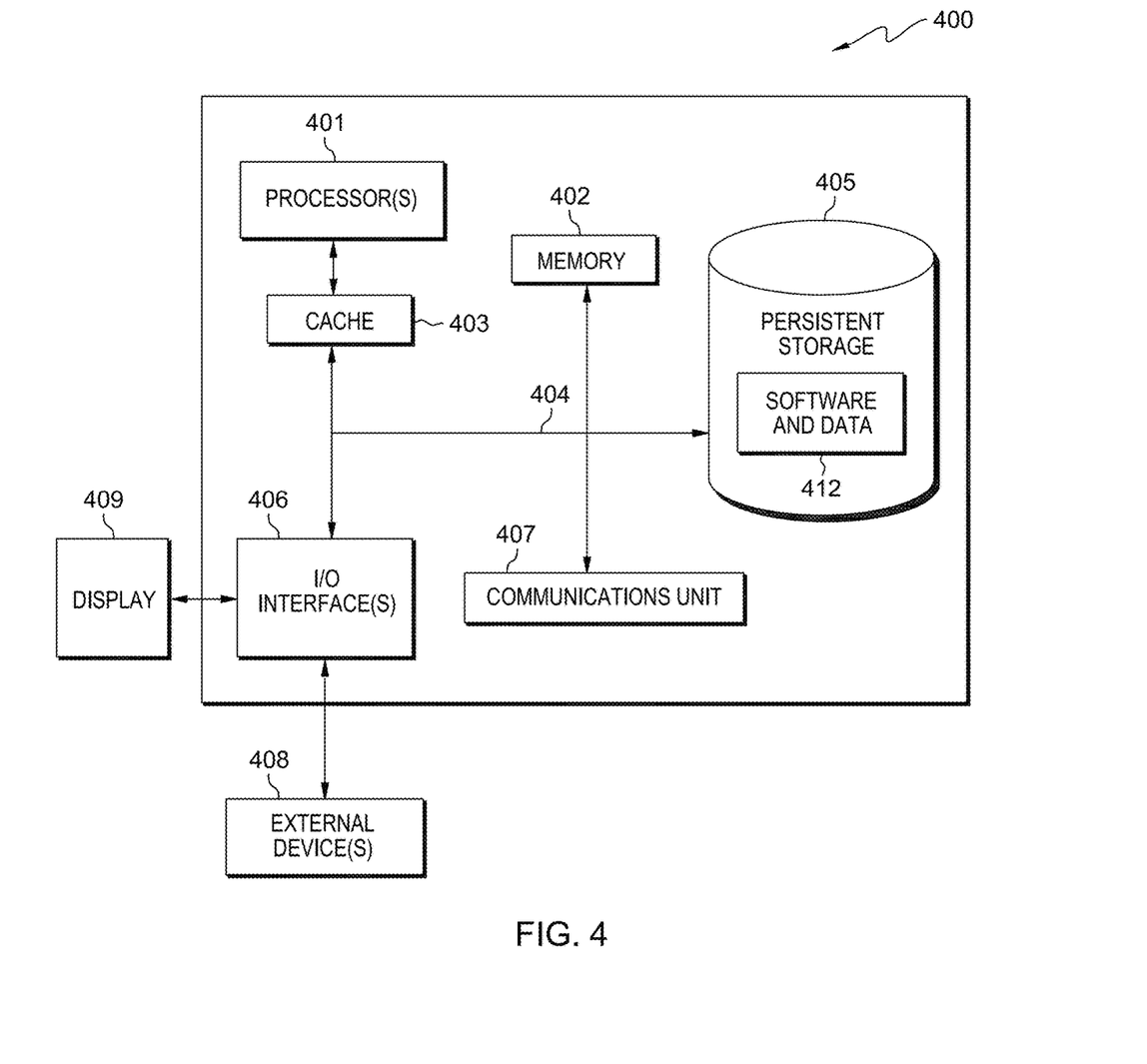
FIG. 4 is a block diagram of components of a computer, in accordance with an embodiment of the present invention.

FIG. 4 depicts computer system 400, which is representative user device 110 and media content. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to user device 110, software and data 412 monitoring suite 111, user data 112, mobility data 113, behavioral data 114, AR program 116, gamification module 117, identification and tracking program 118, AR content generation program 300, and other programs and data (not shown). With respect to media content, software and data 412 includes a plurality of visual and audio files, and other data and programs (not shown).

Communications unit 407, in these examples, provides for communications with other data processing systems or devices, including resources user device 110, sensors 125, and user device 110. In these examples, communications unit 407 includes one or more network interface cards and/or wireless communication adapters. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone. Alternatively, display 409 displays information to a user based on a projection technology, such as virtual retinal display, a virtual display, or image projector.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a computer-implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more computer processors, at an augment reality (AR) device utilized by a user, visual information corresponding to an area the user traverses;
   identifying, by one or more computer processors, one or more hazards within the area;
   determining, by one or more computer processors, a path through the area that the user may traverse to avoid the one or more identified hazards;
   generating, by one or more computer processors, a plurality of elements of AR content, wherein the plurality of elements of AR content includes at least a first element of AR content indicating the determined path;
   displaying, by one or more computer processors, via the AR device, the visual information corresponding to the area to include the plurality of elements of AR content; and
   assessing, by one or more computer processors, based on a position and direction of motion of the user relative to the one or more hazards:
      penalties to the user for moving within a threshold distance of at least one of the one or more hazards; and
      rewards to the user based on the user traversing the determined path through the area and responding to the plurality of elements of AR content.

2. The computer-implemented method of claim 1, further comprising:
   determining, by one or more computer processors, information respectively associated with a hazard of the one or more hazards, wherein the information respectively associated with the hazard is selected from the group consisting of: a type of threat the hazard poses to the user, level of severity of the threat associated with the hazard, and a determination of movement of the hazard.

3. The computer-implemented method of claim 1, wherein generating the plurality of elements of AR content further comprises:
   determining, by one or more computer processors, based on behavioral information corresponding to the user, a first set of elements of AR content that elicit attraction responses by the user; and
   determining, by one or more computer processors, based on behavioral information corresponding to the user, a second set of elements of AR content that elicit avoidance responses by the user.

4. The computer-implemented method of claim 3, wherein:
   the second set of elements of AR content are distributed among: (i) a first group of elements of AR content respectively associated with the one or more hazards and (ii) a second group of elements of AR content positioned along one or more portions of the determined path.

5. The computer-implemented method of claim 3, further comprising:
   determining, by one or more computer processors, the position and the direction of motion of the user as the user traverses the area; and
   determining, by one or more computer processors, based on the position and the direction of motion of the user relative the one or more hazards, the first set of elements of AR content, and the second set of elements of AR content to modify one or more gamification elements.

6. The computer-implemented method of claim 1, further comprising:
including, by one or more computer processors, a set of gamification elements among the displayed visual information corresponding to the area and the included plurality of elements of AR content.

7. The computer-implemented method of claim 6, further comprising:
analyzing, by one or more computer processors, the behavioral information corresponding to the user to determine a set of penalties to assess to the user as the user traverses the area.

8. A computer program product comprising:
at least one computer readable storage medium, and program instructions collectively stored on the at least one computer readable storage medium, the program instructions comprising:
program instructions to receive, at an augment reality (AR) device utilized by a user, visual information corresponding to an area the user traverses;
program instructions to identify one or more hazards within the area;
program instructions to determine a path through the area that the user may traverse to avoid the one or more identified hazards;
program instructions to generate a plurality of elements of AR content, wherein the plurality of elements of AR content includes at least a first element of AR content indicating the determined path;
program instructions to display via the AR device, the visual information corresponding to the area to include the plurality of elements of AR content; and
program instructions to assess, based on a position and direction of motion of the user relative to the one or more hazards:
penalties to the user for moving within a threshold distance of at least one of the one or more hazards; and
rewards to the user based on the user traversing the determined path through the area and responding to the plurality of elements of AR content.

9. The computer program product of claim 8, further comprising:
program instructions, collectively stored on the at least one computer readable storage medium, to determine information respectively associated with a hazard of the one or more hazards, wherein the information respectively associated with the hazard is selected from the group consisting of: a type of threat the hazard poses to the user, level of severity of the threat associated with the hazard, and a determination of movement of the hazard.

10. The computer program product of claim 8, wherein program instructions to generate the plurality of elements of AR content further comprise:
program instructions, collectively stored on the at least one computer readable storage medium, to determine, based on behavioral information corresponding to the user, a first set of elements of AR content that elicit attraction responses by the user; and
program instructions, collectively stored on the at least one computer readable storage medium, to determine, based on behavioral information corresponding to the user, a second set of elements of AR content that elicit avoidance responses by the user.

11. The computer program product of claim 10, wherein:
the second set of elements of AR content are distributed among: (i) a first group of elements of AR content respectively associated with the one or more hazards and (ii) a second group of elements of AR content positioned along one or more portions of the determined path.

12. The computer program product of claim 10, further comprising:
program instructions, collectively stored on the at least one computer readable storage medium, to determine the position and the direction of motion of the user as the user traverses the area; and
program instructions, collectively stored on the at least one computer readable storage medium, to determine, based on the position and the direction of motion of the user relative the one or more hazards, the first set of elements of AR content, and the second set of elements of AR content to modify one or more gamification elements.

13. The computer program product of claim 8, further comprising:
program instructions, collectively stored on the at least one computer readable storage medium, to include a set of gamification elements among the displayed visual information corresponding to the area and the included plurality of elements of AR content.

14. The computer program product of claim 13, further comprising:
program instructions, collectively stored on the at least one computer readable storage medium, to analyze the behavioral information corresponding to the user to determine a set of penalties to assess to the user as the user traverses the area.

15. A computer system comprising:
one or more computer processors, one or more computer readable storage media, and program instructions collectively stored on the one or more computer readable storage media for execution by at least one of the one or more computer processors, the program instructions comprising:
program instructions to receive, at an augment reality (AR) device utilized by a user, visual information corresponding to an area the user traverses;
program instructions to identify one or more hazards within the area;
program instructions to determine a path through the area that the user may traverse to avoid the one or more identified hazards;
program instructions to generate a plurality of elements of AR content, wherein the plurality of elements of AR content includes at least a first element of AR content indicating the determined path;
program instructions to display via the AR device, the visual information corresponding to the area to include the plurality of elements of AR content; and
program instructions to assess, based on a position and direction of motion of the user relative to the one or more hazards:
penalties to the user for moving within a threshold distance of at least one of the one or more hazards; and
rewards to the user based on the user traversing the determined path through the area and responding to the plurality of elements of AR content.

16. The computer system of claim 15, further comprising:
program instructions, collectively stored on the one or more computer readable storage media for execution by at least one of the one or more computer processors, to determine information respectively associated with a hazard of the one or more hazards, wherein the information respectively associated with the hazard is selected from the group consisting of: a type of threat the hazard poses to the user, level of severity of the threat associated with the hazard, and a determination of movement of the hazard.

17. The computer system of claim 15, wherein program instructions to generate the plurality of elements of AR content further comprise:
program instructions, collectively stored on the one or more computer readable storage media for execution by at least one of the one or more computer processors, to determine, based on behavioral information corresponding to the user, a first set of elements of AR content that elicit attraction responses by the user; and
program instructions, collectively stored on the one or more computer readable storage media for execution by at least one of the one or more computer processors, to determine, based on behavioral information corresponding to the user, a second set of elements of AR content that elicit avoidance responses by the user.

18. The computer system of claim 17, wherein:
the second set of elements of AR content are distributed among: (i) a first group of elements of AR content respectively associated with the one or more hazards and (ii) a second group of elements of AR content positioned along one or more portions of the determined path.

19. The computer system of claim 15, further comprising:
program instructions, collectively stored on the one or more computer readable storage media for execution by at least one of the one or more computer processors, to include a set of gamification elements among the displayed visual information corresponding to the area and the included plurality of elements of AR content.

20. The computer system of claim 19, further comprising:
program instructions, collectively stored on the one or more computer readable storage media, to analyze the behavioral information corresponding to the user to determine a set of penalties to assess to the user as the user traverses the area.

* * * * *